(12) United States Patent
Itou et al.

(10) Patent No.: US 7,597,383 B2
(45) Date of Patent: Oct. 6, 2009

(54) PEDESTRIAN PROTECTION APPARATUS, AND METHOD OF TUNING LOAD CHARACTERISTIC OF THE APPARATUS

(75) Inventors: Kaoru Itou, Nisshin (JP); Yoshihiro Ogura, Toyota (JP); Kuniaki Hasegawa, Kariya (JP); Masanobu Fukukawa, Toyota (JP); Hiroki Kurokawa, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 428 days.

(21) Appl. No.: 11/504,893

(22) Filed: Aug. 16, 2006

(65) Prior Publication Data

US 2007/0085356 A1 Apr. 19, 2007

(30) Foreign Application Priority Data

Oct. 19, 2005 (JP) ............................. 2005-304726

(51) Int. Cl.
*B60R 19/18* (2006.01)
(52) U.S. Cl. .................. 296/187.04; 293/120
(58) Field of Classification Search ............... 180/271, 180/274; 296/187.04, 187.09; 293/102, 293/120
See application file for complete search history.

(56) References Cited

U.S. PATENT DOCUMENTS 6,540,275 B1 * 4/2003 Iwamoto et al. ............... 293/24
6,634,702 B1 10/2003 Pleschke et al.
7,434,872 B2 * 10/2008 Steller .................... 296/193.09
7,441,828 B2 * 10/2008 Noyori et al. ........... 296/187.04
2002/0125725 A1 * 9/2002 Satou ......................... 293/132
2004/0124643 A1 * 7/2004 Matsumoto et al. ......... 293/115
2007/0046043 A1 * 3/2007 Ito ............................. 293/120
2007/0085356 A1 * 4/2007 Itou et al. .................... 293/120
2007/0108779 A1 * 5/2007 Zacheiss et al. ............. 293/120
2007/0138815 A1 * 6/2007 Fukukawa et al. ............ 293/15
2007/0182171 A1 * 8/2007 Kageyama et al. .......... 293/102
2007/0284915 A1 * 12/2007 Hasegawa et al. ...... 296/187.04
2008/0001433 A1 * 1/2008 Noyori et al. .......... 296/187.04
2008/0169661 A1 * 7/2008 Hirano ......................... 293/15
2008/0217959 A1 * 9/2008 Noyori et al. .......... 296/187.04
2008/0258485 A1 * 10/2008 Fukukawa et al. ......... 296/1.04

FOREIGN PATENT DOCUMENTS

| DE | 10 2004 007 571 A1 | 8/2005 |
| EP | 1 300 293 A1 | 4/2003 |
| JP | 2001-277963 A1 | 10/2001 |
| JP | 2002-274298 A1 | 9/2002 |
| JP | 2004-025976 A1 | 1/2004 |
| JP | 2004-203183 A1 | 7/2004 |
| JP | 2004203158 A * | 7/2004 |
| WO | WO 01/00478 A1 | 1/2001 |

* cited by examiner

*Primary Examiner*—Jason S Morrow
(74) *Attorney, Agent, or Firm*—Burr & Brown

(57) ABSTRACT

In a pedestrian protection apparatus installed in a lower part of a front of a vehicle, a plate extends in a longitudinal direction of the vehicle, and includes a front section having at least a portion protruding from the front of the vehicle, a rear section fixed to the vehicle, and a center section provided between the front and rear sections. The front section is more rigid than the rear section, and the center section is less rigid than the front section and more rigid than the rear section.

8 Claims, 13 Drawing Sheets

PEDESTRIAN PROTECTION APPARATUS, AND METHOD OF TUNING LOAD CHARACTERISTIC OF THE APPARATUS

The present application is based on Japanese Patent Application No. 2005-304726 filed on Oct. 19, 2005, the contents of which are incorporated herein by reference.

BACKGROUND OF THE INVENTION

1. Field of the Invention

The present invention relates to a pedestrian protection apparatus, and a method of tuning a load characteristic of the apparatus. More particularly, the present invention relates to an improved configuration of a pedestrian protection apparatus that is installed on a lower front side of a vehicle and that protects the legs of a pedestrian by sweeping the legs in contact with lower parts of the legs when the front of the vehicle collides with or comes into contact with the legs, and to a method of advantageously tuning a load characteristic of the apparatus.

2. Description of the Related Art

Various types of protection apparatuses are conventionally installed on front, rear, or side faces of vehicles, such as automobiles, mainly in order to absorb a shock energy caused in a collision and to thereby protect the body of the vehicles and passengers. In recent years, apparatuses for protecting a pedestrian have been installed at the fronts of vehicles to protect the pedestrian when the front of the vehicles collide (comes into contact) with the pedestrian.

A so-called leg sweep member is a known pedestrian protection apparatus. The leg sweep member is installed inside or below a front bumper independently, and applies a reaction force to an impact load, which is inputted in a collision between the pedestrian and the front of the vehicle, to the lower parts of the legs of the pedestrian so that the lower parts of the legs are swept away (tripped) and the pedestrian falls down onto the vehicle. This advantageously reduces the angle of forced bending of the knees in an undesirable direction caused by the collision, minimizes the occurrence of injuries such as a bone fracture of a knee, and achieves protection and safety of the pedestrian.

For example, JP-A-2001-277963 discloses a leg sweep member in which a resin foam member and a beam are mounted in the lower part of the front of a vehicle. The resin foam member extends in a width direction of the vehicle such that at least a part thereof protrudes from the front of the vehicle, and the beam extends in the width direction of the vehicle and is in contact with the rear side of the resin foam member. JP-A-2004-25976 discloses a leg sweep member that is formed of, for example, a metal pipe, and that is fixed to the lower part of the front of a vehicle such as to extend in the width direction of the vehicle. However, both the leg sweep members disclosed in the above publications have disadvantages to be overcome. That is, in the former pedestrian protection apparatus including the resin foam member and the beam, the number of components is large. For this reason, the component cost is high, and it is troublesome to mount the apparatus. In contrast, in the latter pedestrian protection apparatus formed of a metal pipe, the weight thereof is inevitably high, and it is difficult to form the apparatus in a shape that conforms to the shape of the front of the vehicle.

In view of these circumstances, JP-A-2004-203183 proposes a pedestrian protection apparatus including a synthetic resin plate. The synthetic resin plate is fixed at a rear section to a vehicle such as to extend in the longitudinal direction of the vehicle and such that at least a portion of a front section thereof protrudes from the front of the vehicle. When the front of the vehicle collides with a pedestrian, the projecting portion of the front section protruding from the front of the vehicle comes into contact with lower parts of the legs of the pedestrian, and sweeps the legs away. In this known pedestrian protection apparatus, a plurality of flat ribs are disposed on one surface of the front section of the plate and formed in a lattice, and therefore, a high rigidity of the front section is ensured. Moreover, a section of the plate other than the front section is shaped like a flat plate extending in the longitudinal direction of the vehicle with a sufficient length so that the front section can protrude from the front of the vehicle.

In the pedestrian protection apparatus having the above-described configuration, the number of components is small. Moreover, since the plate, which partly protrudes from the front of the vehicle, is formed of easily formable synthetic resin, the pedestrian can be protected while effectively overcoming the disadvantages of the apparatus including the resin foam member and the beam, and the apparatus formed of a metal pipe. In addition, since the front section of the plate is highly rigid, it is prevented from being deformed by a shock caused by the contact with the legs of the pedestrian, or the amount of deformation is sufficiently reduced. Therefore, a reaction force to the impact load inputted to the plate efficiently acts on the legs of the pedestrian via the front section.

However, as the result of various tests and investigations, the present inventors found that the maximum value of the impact load inputted when the front section of the synthetic resin plate in the above pedestrian protection apparatus collided with the legs of a pedestrian did sometimes not reach a target value, that a reaction force required to sweep the legs away in the collision could not be ensured in this case, and that protection of the legs was insufficient.

In general, in a pedestrian protection apparatus installed at the front of the vehicle, the load characteristic is required to vary depending on the type of the vehicle, for example, to be optimized in accordance with the shape of the front of the vehicle and a shock-absorbing member of a front bumper mounted at the front of the vehicle together with the pedestrian protection apparatus so that a reaction force to an impact load applied in a collision between the legs of a pedestrian and the front of the vehicle sufficiently acts on the legs to reliably sweep the legs away, regardless of the type of the vehicle in which the apparatus is installed. However, in the known pedestrian protection apparatus having the above-described configuration, it is difficult to tune the load characteristic, so that it is difficult to optimize the same.

FEATURES OF THE INVENTION

The present invention has been made in view of the above-described circumstances, and an object of the invention is to provide a pedestrian protection apparatus that reliably sweeps away and sufficiently protects legs of a pedestrian with which the front of a vehicle collides. Another object of the invention is to provide a method of tuning a load characteristic that can easily and reliably optimize the load characteristic of the pedestrian protection apparatus.

In order to overcome the above-described problems, the present inventors conducted a pedestrian collision test under the assumption that the front of a vehicle collided with the legs of the pedestrian. In this test, a test vehicle including the above-described known pedestrian protection apparatus having a synthetic resin plate was used. As a result of the test, deformation of a front section of the plate having high rigidity was prevented, or the amount of deformation was minimized in a collision with the leg of the pedestrian, as described above. However, since a remaining section of the plate other than the front section was shaped like a simple flat plate, and is relatively long in the longitudinal direction of the vehicle, the plate was bent (buckled) at a center portion in a length direction (longitudinal direction of the vehicle) corresponding to a shock-receiving direction, in which the shock is primarily applied to the apparatus. Furthermore, as for the load characteristic of the known apparatus, the pedestrian collision test also revealed that the amount of increase of the impact load per unit time in the early stage of the shock input was relatively small.

From the above facts, the present inventors made the following assumption. That, when the front section of the plate in the known apparatus comes into contact with the legs of the pedestrian, the remaining section of the plate other than the front section is bent in an approximate V-shape, and therefore, the pedestrian protection apparatus provides a load characteristic such that the impact load gently increases in the early stage of the shock input, such that a long period of time is required for the impact load to reach a target load. For this reason, the maximum value of the impact load sometimes does not reach the target value in the known pedestrian protection apparatus.

Accordingly, the present inventors earnestly studied the relationship between deformation of the remaining section of the plate other than the front section having high rigidity, and the load characteristic. As a result of the study, the present inventors found that the impact load could be rapidly increased in the early stage of the shock input in a collision between the front of the vehicle and the legs of the pedestrian by bending (buckling), by the input shock, the remaining section of the plate at two points spaced with a predetermined distance therebetween in the longitudinal direction corresponding to the shock-receiving direction (longitudinal direction of the vehicle) so that the plate is bent in an approximate S-shape or a staircase shape. Through further various tests and investigations, the present inventors also found that the remaining section of the plate was deformed to be bent in an approximate S-shape or in a staircase form by the input shock when the remaining section included portions that had mutually different rigidities and were arranged in a specific order.

The present invention has been completed on the basis of the above findings. The principle of the present invention is to provide a pedestrian protection apparatus, which includes a synthetic resin plate mounted in a lower part of a front side of a vehicle and extending in a longitudinal direction of the vehicle. The plate includes a front section having at least a protruding portion protruding from the front side of the vehicle, a rear section fixed to the vehicle, and a center section provided between the front and rear sections. The protruding portion of the front section of the plate comes into contact with and sweeps away a lower part of a leg of a pedestrian to protect the leg when the front side of the vehicle collides with the leg. The front section of the plate is more rigid than the rear section, and the center section is less rigid than the front section and more rigid than the rear section.

In the pedestrian protection apparatus according to the present invention, when the front side of the vehicle collides with the pedestrian, the front section of the synthetic resin plate extending in the longitudinal direction of the vehicle comes into contact with the leg of the pedestrian. The front section is more rigid than the other sections of the plate. The other sections include the rear section having the portion fixed to the vehicle and is less rigid than the other sections of the plate, and the center section which is more rigid than the rear section.

For this reason, when a shock is inputted by a collision between the leg of the pedestrian and the front side of the vehicle, stress concentration is caused in a boundary portion between the center and rear sections of the plate, and in a front adjacent portion of the rear section that is on the front side and adjacent to a portion fixed to the vehicle. Therefore, the plate is bent (buckled) at two positions, that is, the boundary portion and the front adjacent portion so as to be in an approximate S-shape or a staircase shape, and the impact load is rapidly increased in the early stage of the shock input. As a result, the maximum value of the input load inputted by the collision between the leg of the pedestrian and the front of the vehicle can quickly and reliably reach a target value, and a reaction force to the impact load can be ensured sufficiently and reliably.

Therefore, in the pedestrian protection apparatus of the present invention, a reaction force to the impact load inputted in a collision between the leg and the front of the vehicle sufficiently acts on the leg. This allows the leg to be reliably swept away and to be sufficiently protected at a higher level.

For example, by increasing or decreasing the dimension of the center section of the plate in the longitudinal direction of the vehicle, the distance between the boundary portion between the center and rear sections, and the front adjacent portion on the front side of and adjacent to the portion of the rear section fixed to the vehicle, in other words, the distance between the portions that are bent when a shock is inputted in a collision between the leg of the pedestrian and the front of the vehicle can be changed arbitrarily. Consequently, it is possible to adjust the amount of increase of the impact load in the early stage of the shock input. For example, the amount of increase of the impact load can be decreased by increasing the distance between the boundary portion and the front adjacent portion, and can be increased by decreasing the distance.

Therefore, the load characteristic can be arbitrarily changed by simply changing the dimension of the center section of the plate in the longitudinal direction of the vehicle. As a result, even when the required characteristic varies depending on the type of the vehicle in which the apparatus is installed, it is possible to easily correspond to the variation.

The present invention is preferably practiced in at least the following features.

(1) A pedestrian protection apparatus for a vehicle comprising:

a synthetic resin plate mounted in a lower part of a front side of a vehicle and extending in a longitudinal direction of the vehicle, the plate including a front section having at least a protruding portion protruding from the front side of the vehicle, a rear section fixed to the vehicle, and a center section provided between the front and rear sections, wherein the protruding portion of the front section of the plate comes into contact with and sweeps away a lower part of a leg of a pedestrian to protect the leg when the front side of the vehicle collides with the leg, and wherein the front section of the plate is more rigid than the rear section, and the center section is less rigid than the front section and more rigid than the rear section.

(2) The pedestrian protection apparatus according to the above feature (1), wherein the center section of the plate includes a plurality of areas having mutually different rigidities, and the areas extend over a full dimension of the vehicle in a transverse direction, adjoin in the longitudinal direction of the vehicle, and are arranged in decreasing order of the rigidities from a front side of the center section. According to this feature, when a shock is inputted by a collision between the leg of the pedestrian and the front of the vehicle, the plate can also be bent at a boundary portion between the areas having mutually different rigidities in the center section, depending on the volume of the shock. This can effectively suppress an excessive increase of the shock load in the early stage of the shock input.

The pedestrian protection apparatus according to the above feature (1) or (2), wherein a plurality of reinforcing ribs extending in the longitudinal direction of the vehicle are provided integrally with each of the front and center sections of the plate so as to be spaced in the transverse direction of the vehicle, and the front and center sections are more rigid than the rear section in which the reinforcing ribs are not provided, and wherein the number of the reinforcing ribs provided in the front section is larger than the number of the reinforcing ribs provided in the center section, and the interval between the reinforcing ribs of the front section in the transverse direction of the vehicle is shorter than the interval between the reinforcing ribs of the center section so that the front section is more rigid than the center section. In this case, for example, the rigidities of the front section and the center section can be made different from each other without fixing separate members onto the front section and the center section. Consequently, the plate including the sections having different rigidities, and the entire device can be advantageously configured with a minimized number of components.

(4) The pedestrian protection apparatus according to the above feature (1) or (2), wherein the center section of the plate is thicker than the rear section so that the center section is more rigid than the rear section, and the front section is thicker than the center section so that the front section is more rigid than the center section. According to this feature, the plate including the sections having different rigidities, and the entire device can also be advantageously configured with a minimized number of components.

(5) The pedestrian protection apparatus according to the above feature (1) or (2), wherein a first plate-shaped reinforcing member having a predetermined rigidity is fixed on at least one surface of the center section so that the center section is more rigid than the rear section, and a second plate-shaped reinforcing member which is more rigid than the first plate-shaped reinforcing member is fixed on at least one surface of the front section so that the front section is more rigid than the center section on which the first plate-shaped reinforcing member is fixed. According to this feature, the plate itself can be formed of a simple flat plate having a uniform rigidity, and the plate can be designed easily.

(6) A method of tuning a load characteristic of a pedestrian protection apparatus for a vehicle, wherein the pedestrian protection apparatus comprises:

a synthetic resin plate mounted in a lower part of a front side of a vehicle and extending in a longitudinal direction of the vehicle, the plate including a front section having at least a protruding portion protruding from the front side of the vehicle, a rear section having a fixed portion fixed to the vehicle, and a center section provided between the front and rear sections, wherein the protruding portion of the front section of the plate comes into contact with and sweeps away a lower part of a leg of a pedestrian to protect the leg when the front of the vehicle collides with the leg, wherein the front section of the plate is more rigid than the rear section, and the center section is less rigid than the front section and more rigid than the rear section so that the plate is bent at a boundary portion between the center section and the rear section and at a front adjacent portion of the rear section on the front side of and adjacent to the fixed portion by an impact load which is inputted when the protruding portion of the front section comes into contact with the leg of the pedestrian, and wherein a maximum value of the impact load is adjusted and the load characteristic is tuned by arbitrarily changing the dimension of the center section in the longitudinal direction of the vehicle so as to change the distance between the boundary portion and the front adjacent portion.

According to this feature, for example, even when various load characteristics are required, depending on the shape of the front of the vehicle and a shock-absorbing member of a front bumper installed at the front side of the vehicle together with the pedestrian protection apparatus, the load characteristic can be easily tuned by arbitrarily changing the maximum value of the impact load by means of an extremely simple design change, that is, by simply changing the dimension of the center section of the plate in the longitudinal direction of the vehicle.

Therefore, the load characteristic of the pedestrian protection apparatus can be optimized easily and reliably. As a result, when the front of the vehicle collides with the leg of the pedestrian, a reaction force to the impact load can sufficiently act on the leg, and the leg can be reliably swept away, regardless of the type of the vehicle in which the apparatus is installed.

(7) A method of tuning a load characteristic of a pedestrian protection apparatus for a vehicle, wherein the pedestrian protection apparatus comprises:

a synthetic resin plate mounted in a lower part of a front side of a vehicle and extending in a longitudinal direction of the vehicle, the plate including a front section having at least a protruding portion protruded from the front side of the vehicle, a rear section having a fixed portion fixed to the vehicle, and a center section provided between the front and rear sections, wherein the protruding portion of the front section of the plate comes into contact with and sweeps away a lower part of a leg of a pedestrian to protect the leg when the front side of the vehicle collides with the leg, wherein the front section of the plate is more rigid than the rear section, and the center section is less rigid than the front section and more rigid than the rear section so that the plate is bent at a boundary portion between the center section and the rear section and at a front adjacent portion of the rear section on the front side of and adjacent to the fixed portion by an impact load which is inputted when the protruding portion of the front section comes into contact with the leg of the pedestrian, and wherein a maximum value of the impact load is adjusted and the load characteristic is tuned by fixing a first reinforcing member to the boundary portion and fixing a second reinforcing member to the front adjacent portion, the first reinforcing member increasing a rigidity of the boundary portion within a range below that of the front section, and the second reinforcing member increasing a rigidity of the front adjacent portion within a range below that of the center section.

According to this feature, for example, even when various load characteristics are required, depending on the shape of the front of the vehicle and a shock-absorbing member of a front bumper installed at the front of the vehicle together with the pedestrian protection apparatus, the flexural elastic constants and flexural strengths of the boundary portion and the front adjacent portion can be appropriately changed by an extremely simple design change, that is, by simply fixing the first reinforcing member and the second reinforcing member to the boundary portion and the front adjacent portion. Consequently, it is possible to arbitrarily change the maximum value of the impact load and to easily tune the load characteristic.

Therefore, the tuning method according to this feature can effectively achieve operations and advantages similar to those achieved by the above-described feature (6).

(8) The method according to the above feature (6) or (7), wherein the center section of the plate includes a plurality of areas having mutually different rigidities, and the areas extend over a full dimension of the vehicle in a transverse direction, adjoin in the longitudinal direction of the vehicle, and are arranged in decreasing order of the rigidities from a front side of the center section. According to this feature, when a shock is inputted by a collision between the leg of the pedestrian and the front of the vehicle, the plate can also be bent at a boundary portion between the areas having mutually different rigidities in the center section, depending on the volume of the shock. This can effectively suppress an excessive increase of the impact load in the early stage of the shock input. Moreover, the load characteristic can be tuned more accurately.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DESCRIPTION OF THE PREFERRED EMBODIMENTS

In order to more clearly specify the present invention, embodiments of the invention will be described in detail below with reference to the drawings.

Figure 1:
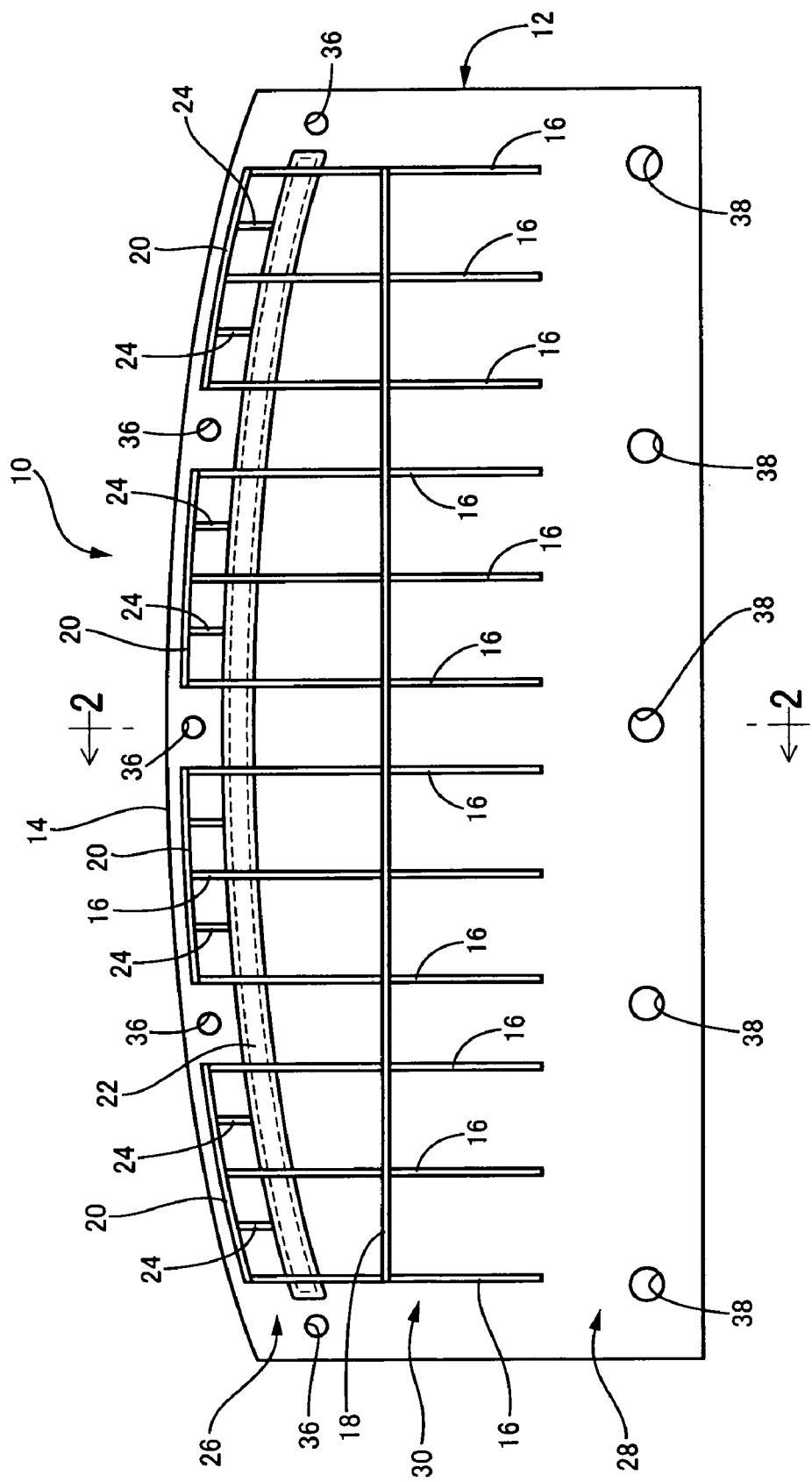
FIG. 1 is an explanatory top view a pedestrian protection apparatus according to a first embodiment of the present invention.
Figure 2:
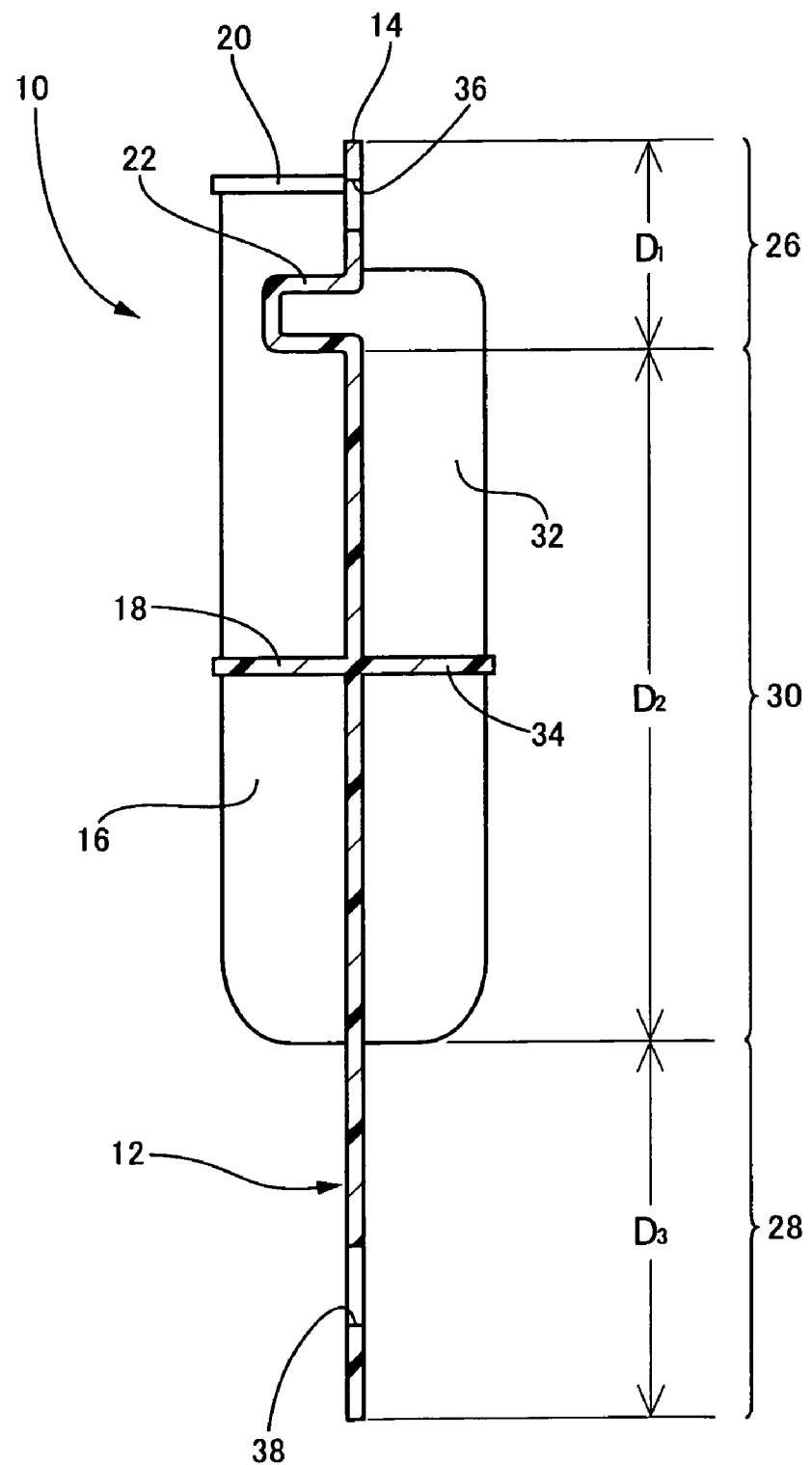
FIG. 2 is a cross-sectional view, taken along line 2-2 of FIG. 1.

FIGS. 1 and 2 are a top view and a cross-sectional view, respectively, schematically showing a leg sweep member 10 serving as a pedestrian protection apparatus according to a first embodiment of the present invention. The leg sweep member 10 of the first embodiment is installed inside a front bumper provided at the front of an automobile, and includes a base plate 12 serving as the plate, as shown in FIGS. 1 and 2.

More specifically, the base plate 12 is made of, for example, a synthetic resin material such as polypropylene or ABS resin, and is formed of a substantially rectangular thin plate. A dimension of the base plate 12 in the breadth direction in FIG. 1, which corresponds to the width or transverse direction of the automobile in which the leg sweep member 10 is installed (hereinafter referred to as the breadth direction) is smaller by a predetermined dimension than the width of the automobile, and a dimension thereof in the depth direction in FIG. 1, which corresponds to the longitudinal direction of the automobile (hereinafter referred to as the depth direction) is sufficiently smaller than the dimension in the breadth direction. The base plate 12 has an end curved surface 14 that is curved in accordance with the shape of an inner surface of the front bumper. The dimensions of the base plate 12 in the breadth and depth directions are appropriately determined, for example, depending on the width of the automobile in which the leg sweep member 10 is installed, and the size of the installation space. For example, the dimension in the-depth direction is set at approximately 80 to 200 mm, and the thickness is generally set at approximately 3 mm.

A plurality of (twelve in the first embodiment) first ribs 16 having the same height and shaped like a thin flat plate protrude integrally from an upper surface of the base plate 12. The first ribs 16 extend straight and rearward at a constant height from the side of the end curved surface 14. The first ribs 16 are arranged at regular intervals in the breadth direction. A third rib 18 shaped like a thin flat plate also protrudes integrally at almost the center in the depth direction on the upper surface of the base plate 12. The third rib 18 extends straight at a constant height over almost the full dimension of the base plate 12 in the breadth direction, and is combined with each of the first ribs 16 in the form of a cross.

The interval between the first ribs 16 is, for example, approximately 25 mm. The height and thickness of the first ribs 16 are approximately 25 mm and approximately 3 mm, respectively. The dimension of the first ribs 16 is about three-fourths of the dimension of the base plate 12 in the depth direction. The height and thickness of the third rib 18 are substantially equal to those of the first ribs 16.

A plurality of (four in the first embodiment) fourth ribs 20 having a predetermined dimension protrudes integrally from a front end of the upper surface of the base plate 12. The fourth ribs 20 extend in the depth direction, and are arranged in line along the end curved surface 14. Each of the fourth ribs 20 connects front ends of some (three in the first embodiment) of the first ribs 16. The fourth ribs 20 are shaped like a thin flat plate, and the height and thickness thereof are substantially equal to those of the first ribs 16 and the third rib 18.

A fifth rib 22 is provided a predetermined distance behind the fourth ribs 20 on the upper surface of the base plate 12. The fifth rib 22 projects at a predetermined height, and extends over almost the full dimension of the base plate 12 in the breadth direction. That is, at a position offset rearward from the end curved surface 14a of the base plate 12 by a distance corresponding to about one-fourth of the dimension of the base plate 12 in the depth direction, the fifth rib 22 extends across a front part of the base plate 12, and crosses all the first ribs 16. A front side face of the fifth rib 22 faces rear side faces of the fourth ribs 20 with a predetermined space therebetween. Unlike the first ribs 16 and the third and fourth ribs 18 and 20 that are each shaped like a thin flat plate, the fifth rib 22 is formed by bending a rear portion of the front part of the upper surface of the base plate 12 so that the fifth rib 22 is open downward and is angularly U-shaped in cross section.

Second ribs 24 are provided integrally from the upper surface of the base plate 12 between the fourth ribs 20 and the fifth rib 22 that face each other. The second ribs 24 extend straight in the longitudinal direction from rear side faces of the fourth ribs 20 to a front side face of the fifth rib 22. Each of the second ribs 24 is provided approximately at the midpoint between the first longitudinal ribs 16 that are adjacent to each other in the breadth direction. That is, between the fourth ribs 20 and the fifth rib 22 that face each other on the upper surface of the base plate 12, front portions of the first ribs 16 and the second ribs 24 are arranged in the breadth direction at a short interval of approximately 12.5 mm that corresponds to half the interval between the first ribs 16. Similar to the first ribs 16 and the third and fourth ribs 18 and 20, the second ribs 24 are each shaped like a thin flat plate, and have a height and a thickness substantially equal to those of the ribs 16, 18, and 20.

In this way, the first ribs 16, the second ribs 24, the fourth ribs 20, and the fifth rib 22 are provided integrally from a front section 26 of the base plate 12 so that the ribs are combined in a lattice form. The area of the front section 26 is about one-fourth of the total area of the upper surface of the base plate 12. On a rear section 28 whose area is about one-fourth of the total area of the upper surface of the base plate 12, projections, such as ribs, are not provided, and an upper surface of the rear section 28 is flat. On a center section 30 whose area is about a half of the total area of the upper surface of the base plate 12, remaining portions of the first ribs 16 other than the front portions, and the third rib 18 are integrally provided so that each of the remaining portions crosses the third rib 18.

Accordingly, in the front section 26 on which the four-types of ribs 16, 20, 22, and 24 are provided, the rigidity against a bending load, that is, the deformation strength against an impact load inputted in the depth direction when the leg sweep member 10 is installed in the automobile, is sufficiently higher than that of the rear section 28 of the base plate 12 on which ribs are not provided. Further, the center section 30 of the base plate 12, on which a smaller number of ribs 16 and 18 are provided than on the front section 26, is less rigid than that of the front section 26 and more rigid than the rear section 28.

As is evident from the above, in the leg sweep member 10 of the first embodiment, the first ribs 16 and the second ribs 24 serve as reinforcing ribs, and the third, fourth, and fifth ribs 18, 20, and 22 serve as auxiliary reinforcing ribs. Since the total dimension of the base plate 12 in the depth direction is generally approximately 80 to 200 mm, as described above, the dimensions ($D_1$ and $D_3$ in FIG. 2) in the depth direction of the front section 26 having the highest rigidity and the rear section 28 having the lowest rigidity are each approximately 15 to 50 mm, and the dimensions ($D_2$ in FIG. 2) in the depth direction of the center section 30, which is less rigid than the front section 26 and more rigid than the rear section 28, is approximately 50 to 100 mm.

Figure 3:
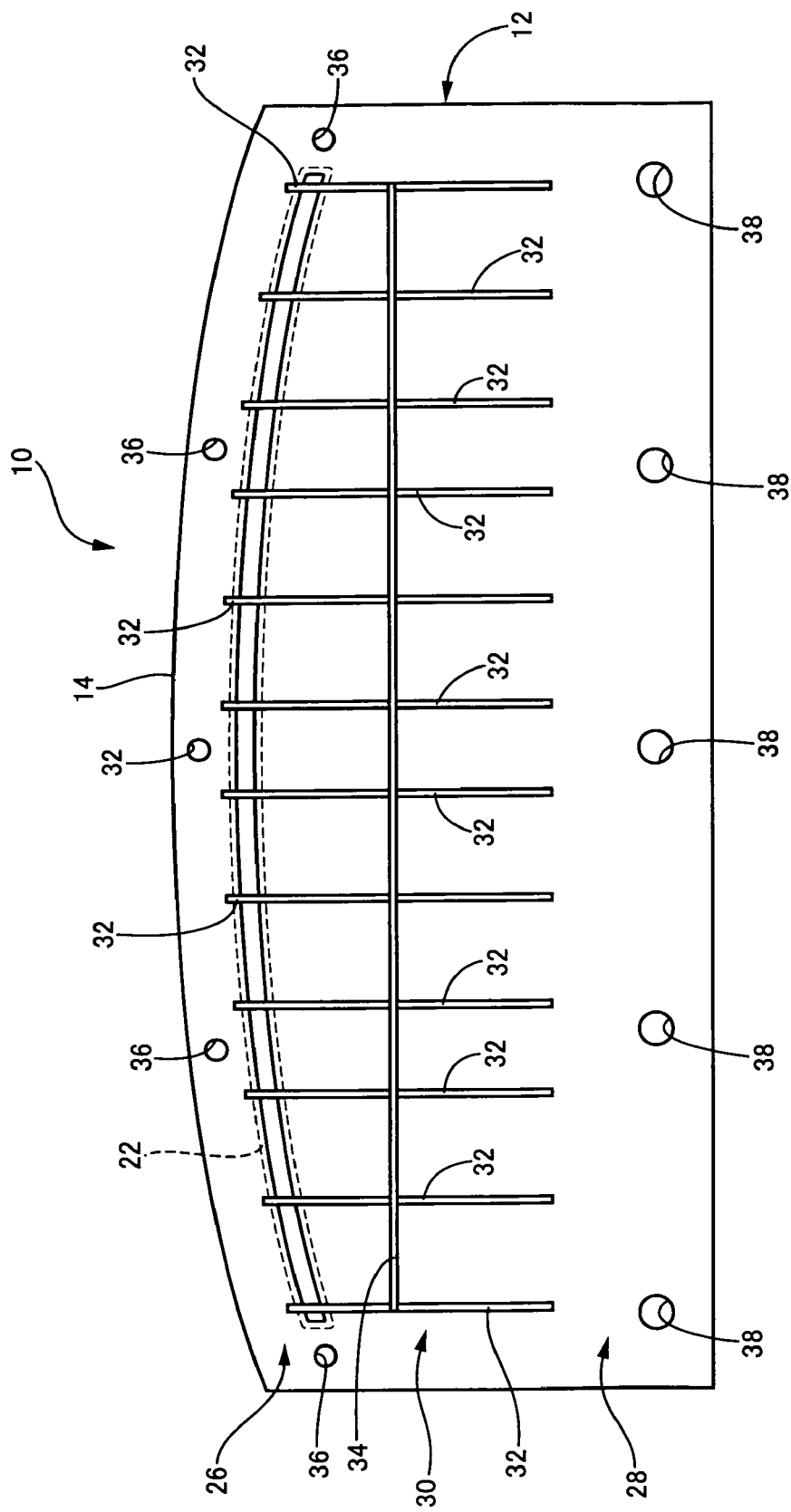
FIG. 3 is an explanatory bottom view of the pedestrian protection apparatus shown in FIG. 1.

As shown in FIGS. 1 to 3, a plurality of first auxiliary ribs 32 and a second auxiliary rib 34 are also provided on lower surfaces of the front section 26 and the center section 30 of the base plate 12. The first and second auxiliary ribs 32 and 34 are respectively positioned corresponding to the first ribs 16 and the third rib 18, and have structures substantially similar to those of the ribs 16 and 18. The number of the first auxiliary ribs 32 is the same as that of the first ribs 16. Therefore, the rigidities of the front section 26 and the center section 30 are further increased as a whole. Through-holes 36 and 38 are provided in a front end and side ends of the front section 26 of the base plate 12 and in a rear end of the rear section 28. When the leg sweep member 10 is installed in the automobile, resin clips and fixing bolts, which will be described below, are passed through the through-holes 36 and 38. The through-holes 36 and 38 are arranged at predetermined intervals in the breadth direction.

Figure 4:
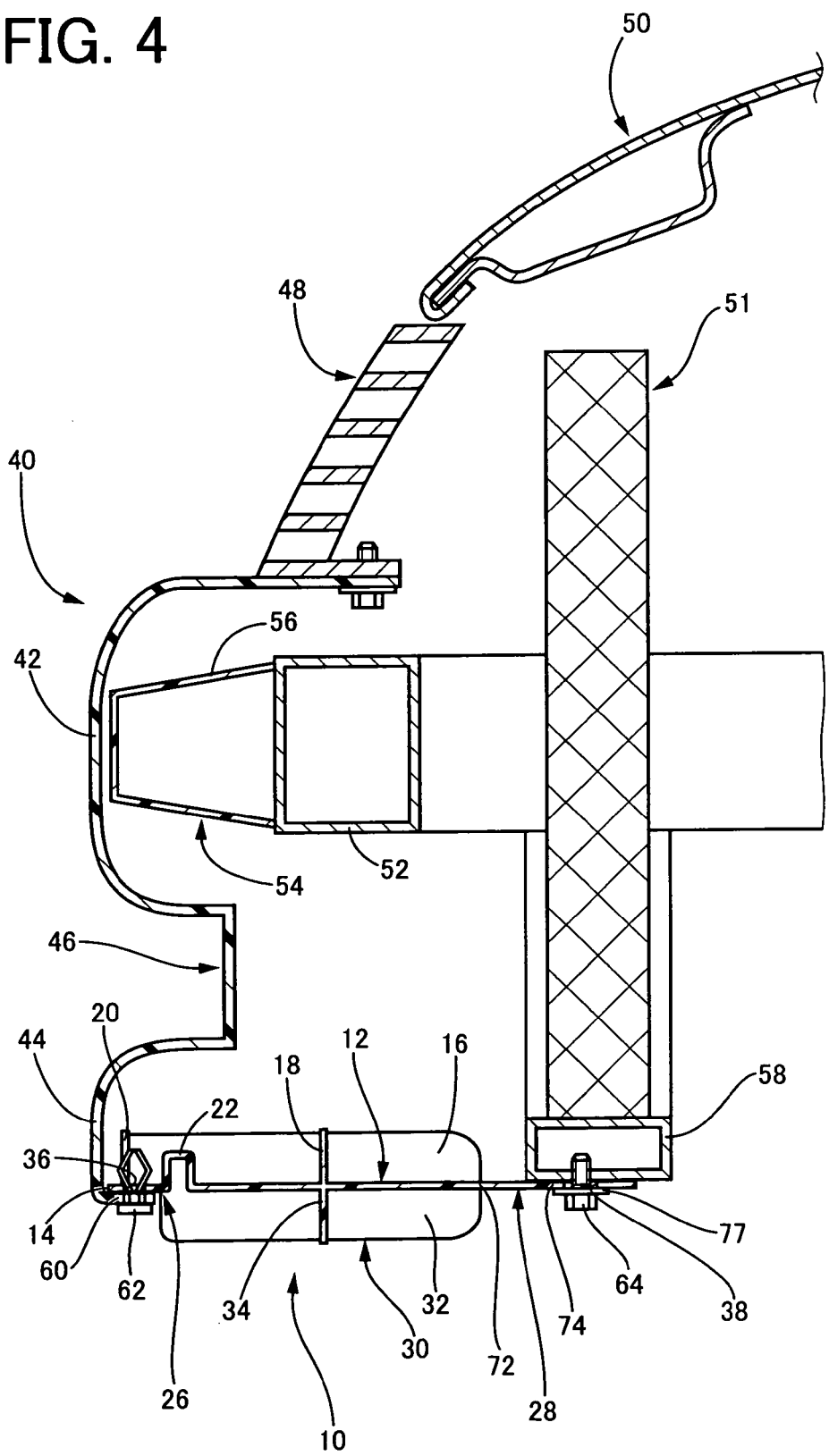
FIG. 4 is an explanatory view showing a state in which the pedestrian protection apparatus shown in FIG. 1 is installed in a vehicle.

The leg sweep member 10 having the above-described configuration is installed inside a front bumper 40 provided at the front of the automobile, for example, in a manner shown in FIG. 4. The front bumper 40 has a bumper cover 46 including an upper projecting portion 42 and a lower projecting portion 44 that protrude from the front of the automobile. The bumper cover 46 is disposed so that the upper projecting portion 42 is placed at a height such as to come into contact with the knee of a pedestrian when the bumper cover 46 collides with the pedestrian, and so that the lower projecting portion 44 is placed at a height such as to come into contact with a portion near the shank of the pedestrian (see FIG. 5). In this position, the bumper cover 46 is mounted, for example, by being fixed to a front grille 48, which forms a front face of the automobile, by bolts. In FIG. 4, reference numerals 50 and 51 denote a bonnet and a radiator, respectively.

A bumper reinforcement 52 made of a rigid member is fixed inside the upper projecting portion 42 of the bumper cover 46 that is thus mounted at the front of the automobile (offset rearward from the front of the automobile). The bumper reinforcement 52 faces an inner surface of the upper projecting portion 42 with a predetermined space therebetween, and extends in the width direction of the automobile. Further, a shock-absorbing member 54 is fixed to the bumper reinforcement 52 between the bumper reinforcement 52 and the upper projecting portion 42 of the bumper cover 46. The shock-absorbing member 54 is configured in a known manner, and has a thin resin body 56 that is shaped like a square pillar, which has a trapezoidal shape taken in a plane parallel to the impact-receiving direction and closed at one side, and is less rigid than the leg sweep member 10.

The front section 26 of the base plate 12 in the leg sweep member 10 is disposed inside the lower projecting portion 44 of the bumper cover 46, and an upper surface of a rear portion of the rear section 28 is in contact with a lower surface of a radiator support 58 that extends in the widthwise direction of the automobile and is fixed to the front of the automobile so as to support the radiator 51. Resin clips 62 extending through an inward flange 60 integrally provided with a lower end of the lower projecting portion 44 are fitted in the corresponding through-holes 36 provided in the front end and the side ends of the front section 26 of the base plate 12, and the front section 26 is thereby fixed to the inward flange 60. Also, each of fixing bolts 64 are fitted in the corresponding one of through-holes 38 at the rear end of the rear section 28, and the rear section 28 is thereby fixed to the radiator support 58.

Accordingly, the leg sweep member 10 horizontally extends in the longitudinal direction of the automobile inside the lower projecting portion 44 of the bumper cover 46, and connects the lower projecting portion 44 and the radiator support 58 while the front section 26 of the base plate 12 protrudes from the front of the automobile. While the base plate 12 is fixed to the bumper cover 46 and the radiator support 58 by the resin clips 62 and the fixing bolts 64 in this embodiment, the fixing manner is not limited thereto, and other known fixing structures may be adopted appropriately. For example, when the rear section 28 of the base plate 12 is reliably fixed to the radiator support 58, the front section 26 does not always need to be fixed to the bumper cover 46.

Figure 5:
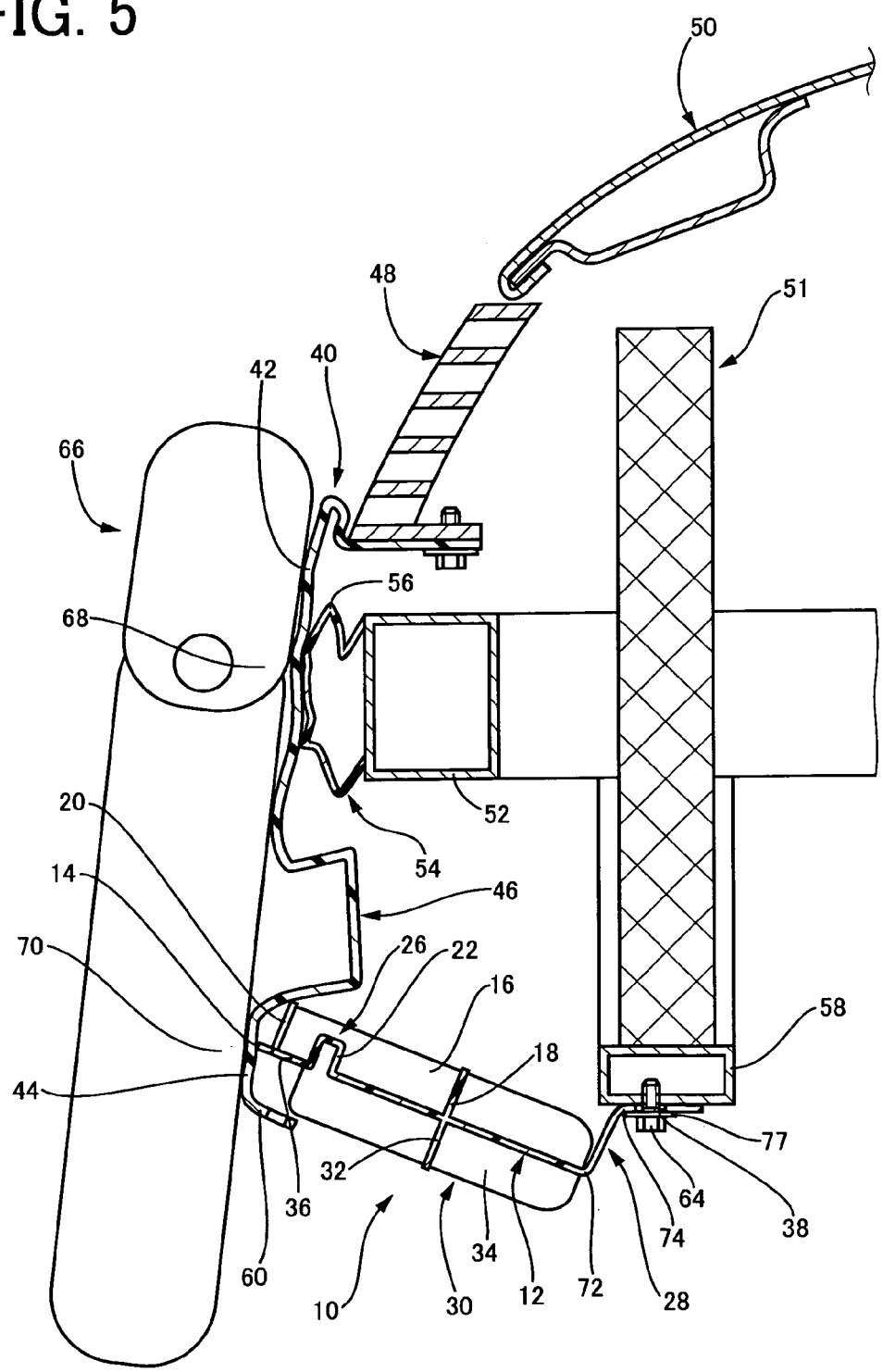
FIG. 5 is an explanatory view showing a state in which the pedestrian protection apparatus is deformed when the front of the vehicle collides with a pedestrian.

As shown in FIG. 5, when the bumper cover 46 of the front bumper 40 comes into contact with or collides with a leg portion 66 of a pedestrian, the upper projecting portion 42 and the lower projecting portion 44 of the bumper cover 46 are deformed (displaced) toward the rear of the automobile by a shock due to the contact with portions of the leg portion 66 near a knee 68 and a shank 70, and the shock-absorbing member 54 and the leg sweep member 10 respectively provided inside the upper and lower projecting portions 42 and 44 are also deformed (displaced) rearward. In this case, since the shock-absorbing member 54 (resin body 56) is less rigid than the leg sweep member 10, the shock-absorbing member 54 is deformed more than the leg sweep member 10. Consequently, the lower projecting portion 44 of the bumper cover 46 protrudes more from the front of the automobile than the upper projecting portion 42, and a reaction force to an impact load caused by the collision between the leg portion 66 and the bumper cover 46 acts the portion of the leg portion 66 near the shank 70 via the lower projecting portion 44. As a result, the portion of the leg portion 66 near the shank 70 is swept away (tripped) by the leg sweep member 10 so that the pedestrian falls down onto the bonnet 50 of the automobile. This reduces bending of the knee 68 of the pedestrian in an undesired direction, and minimizes injury, such as bone fracture, of the knee 68. In this way, protection and safety of the pedestrian are achieved effectively.

Particularly when the leg sweep member 10 of the first embodiment is deformed by a shock inputted in a collision between the leg portion 66 and the bumper cover 46 of the front bumper 40, stress concentration is caused at a boundary portion 72 between the rear section 28 having the lowest rigidity and the center section 30 which is less rigid than the front section 26 and more rigid than the rear section 28, and at a front adjacent portion 74 provided on the front side of and adjacent to a portion of the rear section 28 fixed to the radiator support 58 (more specifically, a portion of the rear section 28 that is provided on the front side of the through-holes 38 and in contact with outer peripheries of washers 77 which are brought into engagement with the peripheral portions of the fixing bolts 64). By the stress concentration, the base plate 12 is bent (buckled) at two positions, namely, at the boundary portion 72 and the front adjacent portion 74. As a result, overall the base plate 12 (leg sweep member 10) is deformed in an approximate S-shape or a staircase shape.

As a result, in this leg sweep member 10, the impact load is rapidly increased in the early stage of the shock input. Therefore, the maximum value of the impact load inputted by the collision between the leg portion 66 and the bumper cover 46 speedily and reliably reaches a target value, and a sufficient reaction force to the impact load is ensured reliably.

Accordingly, when the bumper cover 46 collides with the leg portion 66 of the pedestrian, a sufficient reaction force to the inputted impact load acts on the leg portion 66, and the leg portion 66 is reliably swept away. Therefore, the leg portion 66 is reliably protected at a higher level.

As described above, when the bumper cover 46 of the front bumper 40 fixed to the automobile comes into contact with or collides with the leg portion 66 in a state in which the leg sweep member 10 is disposed inside the bumper cover 46, the base plate 12 is bent at two positions, that is, at the boundary portion 72 between the center and rear sections 30, 28, and the front adjacent portion 74 provided on the front side of and adjacent to the portion of the rear section 28 fixed to the radiator support 58. Therefore, the impact load inputted to the entire leg sweep member 10 is rapidly increased in the early stage of the input. The maximum value of the impact load greatly depends on the flexural rigidities of the boundary portion 72 and the front adjacent portion 74 of the base plate 12. That is, the maximum value of the impact load is large when the flexural rigidities of the boundary portion 72 and the front adjacent portion 74 are high, and is small when the flexural rigidities are low.

Figure 6:
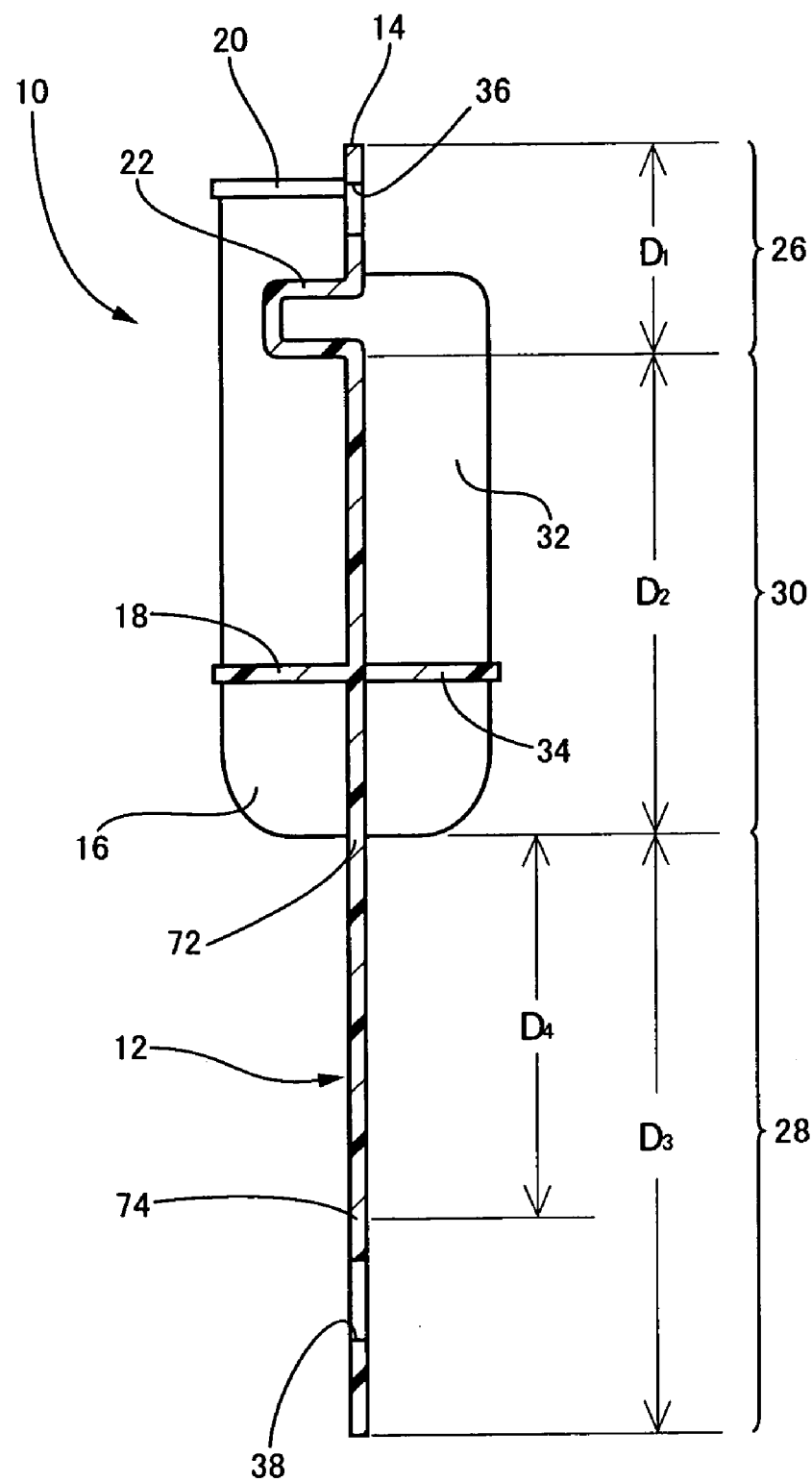
FIG. 6 is a cross-sectional view, corresponding to FIG. 2, a pedestrian protection apparatus according to a second embodiment of the present invention.
Figure 7:
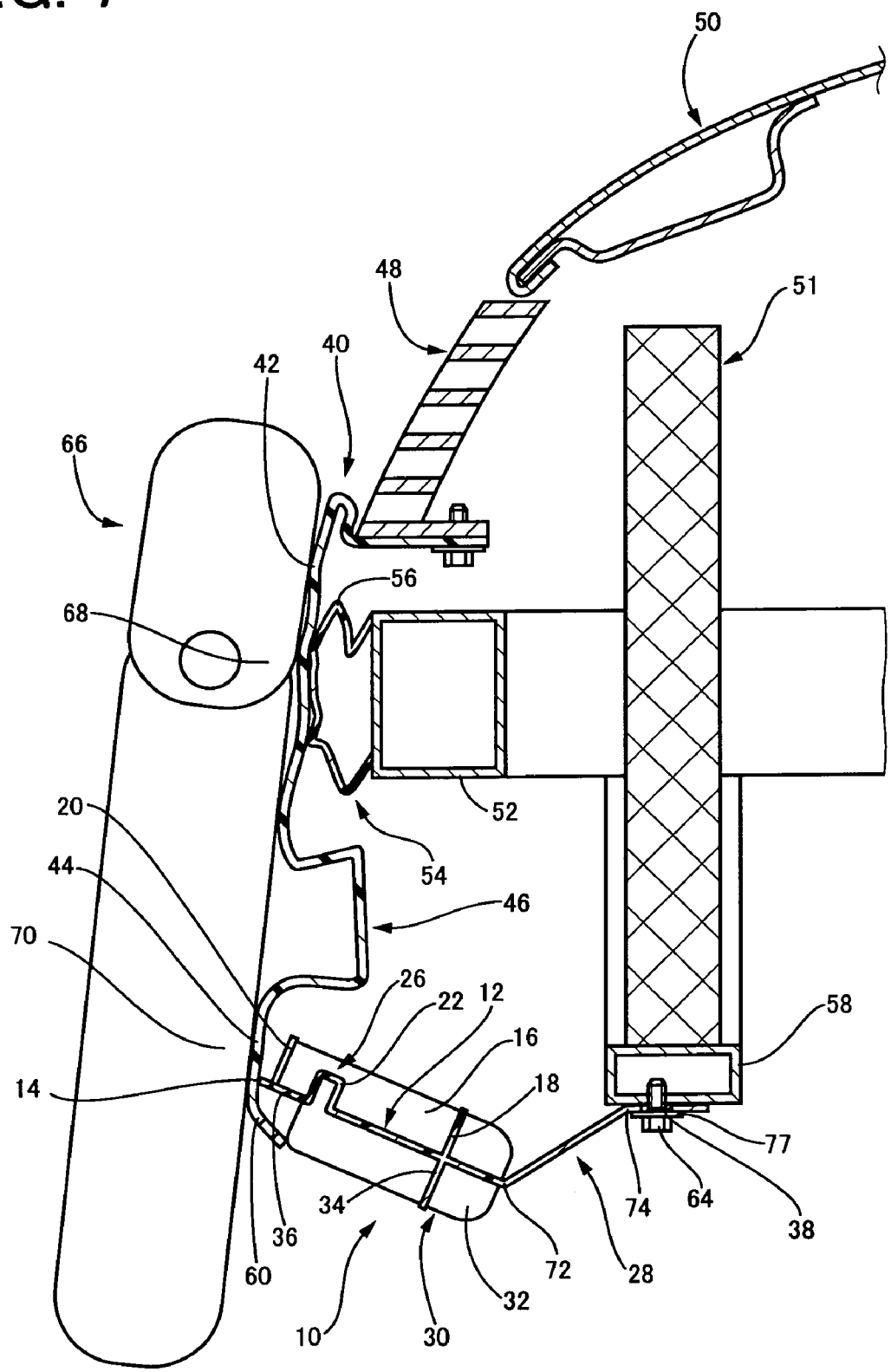
FIG. 7 is an explanatory view, corresponding to FIG. 5, showing a state in which the pedestrian protection apparatus shown in FIG. 6 is deformed when a pedestrian collides with the front of a vehicle in which the pedestrian protection apparatus is installed.

FIG. 6 shows a leg sweep member 10 according to a second embodiment of the present invention. In the second embodiment, the distance $D_4$ between the boundary portion 72 and the front adjacent portion 74 is increased by decreasing the dimension $D_2$ of the center section 30 of the base plate 12 in the depth direction and increasing the dimension $D_3$ of the rear section 28 in the depth direction without changing the dimension $D_1$ of the front section 26 of the base plate 12 in the depth direction. In this case, when the bumper cover 46 collides with the leg portion 66 of the pedestrian, the base plate 12 is easily bent at the boundary portion 72 and the front adjacent portion 74 on the principle of leverage, as shown in FIG. 7. Consequently, the maximum value of an impact load inputted in a collision between the leg portion 66 and the bumper cover 46 can be favorably made small. Materials and components of the leg sweep member 10 shown in FIGS. 6 and 7, and leg sweep members shown in FIGS. 8 to 11, which will be described below, are similar to those of the leg sweep member 10 shown in FIGS. 1 to 5, which are denoted by the same reference numerals, and detailed descriptions thereof are omitted.

In this way, in the leg sweep member 10 of the second embodiment, the maximum value of the impact load can be arbitrarily changed and the load characteristic can be easily tuned by an extremely simple design change, that is, by simply increasing or decreasing the dimension of the center section 30 of the base plate 12 in the depth direction.

Therefore, it is possible to easily and reliably optimize the load characteristic that is required, for example, depending on the shape and inner space of the bumper cover 46 of the front bumper 40 or the configuration of the shock-absorbing member 54 disposed inside the upper projecting portion 42 of the bumper cover 46. Accordingly, a reaction force to the impact load caused in a collision between the leg portion 66 of the pedestrian and the front bumper 40 can sufficiently act on the leg portion 66, regardless of the type of the automobile in which the leg sweep member 10 is installed. As a result, the leg portion 66 can be more reliably and more stably swept away, and can be more sufficiently protected.

Figure 8:
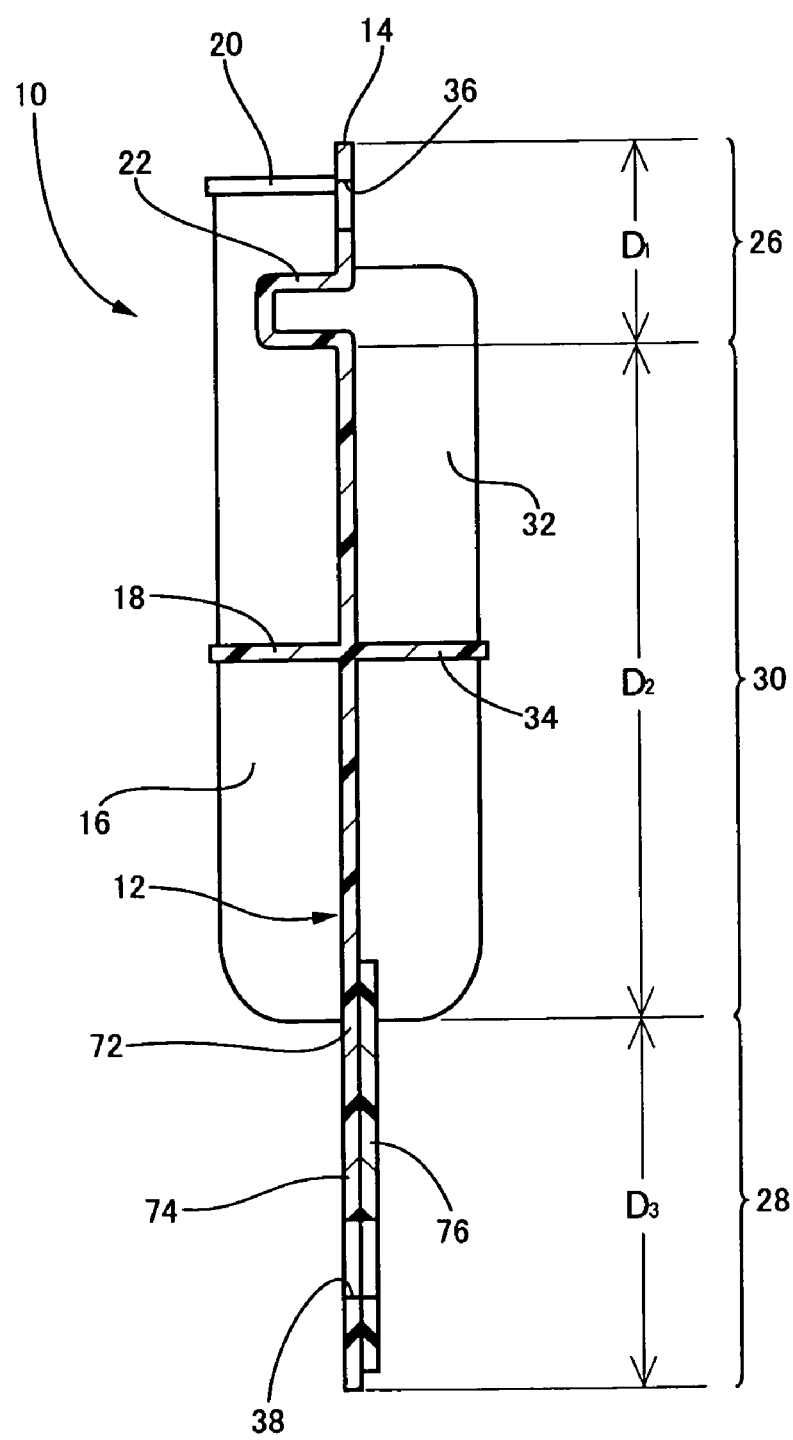
FIG. 8 is a cross-sectional view, corresponding to FIG. 2, a pedestrian protection apparatus according to a third embodiment of the present invention.

FIG. 8 shows a leg sweep member 10 according to a third embodiment of the present invention. In the third embodiment, the dimensions $D_1$, $D_2$, and $D_3$ of the front section 26, the center section 30, and the rear section 28 of the base plate 12 in the longitudinal direction are not changed, and a reinforcing plate 76 having a predetermined flexural rigidity and made of synthetic resin is fixed to an upper or lower surface of the base plate 12 so as to extend over the boundary portion 72 and the front adjacent portion 74.

In this case, the flexural rigidities of the boundary portion 72 and the front adjacent portion 74 are made higher than when the reinforcing plate 76 is not fixed. Therefore, the maximum value of the impact load inputted by a collision between the leg portion 66 of the pedestrian and the bumper cover 46 can be effectively increased, depending on the flexural rigidity of the reinforcing plate 76. As is evident from the above, the reinforcing plate 76 forms a first reinforcing member and a second reinforcing member. Even when the flexural rigidities of the boundary portion 72 and the front adjacent portion 74 are thus increased by the reinforcing plate 76, the base plate 12 is, of course, structured so that the rigidity thereof becomes higher in the order of the rear section 28, the center section 30, and the front section 26.

In the leg sweep member 10 having the above-described configuration, the maximum value of the impact load can be arbitrarily changed and the load characteristic can be easily tuned by an extremely simple design change, that is, by simply fixing any of the reinforcing plate 76 having a different flexural rigidity onto the upper or lower surface of the base plate 12. As a result, the above-described operations and advantages can be achieved effectively.

While the single reinforcing plate 76 is fixed to the base plate 12 so as to extend over the boundary portion 72 and the front adjacent portion 74 in the third embodiment, for example, two reinforcing plates having the same or mutually different rigidities, or two reinforcing members having such rigidities and each made of a material other than the plate, may be respectively fixed as first and second reinforcing members to the boundary portion 72 and the front adjacent portion 74 in order to change the rigidities of the boundary portion 72 and the front adjacent portion 74.

While the embodiments of the present invention have been described in detail above, it should be noted that these embodiments are just exemplary, and that the scope of the present invention is not limited by the embodiments.

For example, while the rigidities of the front section 26, the center section 30, and the rear section 28 of the base plate 12 are made different, depending on whether the ribs 16 to 24 are provided, and the number and positions of the ribs 16 and 24 in the above embodiments, the structure for making the rigidities different are not particularly limited as long as the rigidity of the base plate 12 becomes lower in the order of the front section 26, the center section 30, and the rear section 28.

Therefore, for example, plate-shaped thick and flat ribs may protrude integrally from the front section 26, and the same number of plate-shaped thin and flat ribs as that of the ribs on the front section 26 may protrude integrally from the center section 30. In this case, the rigidity of the base plate 12 can also become lower in the order of the front section 26, the center section 30, and the rear section 28.

Figure 9:
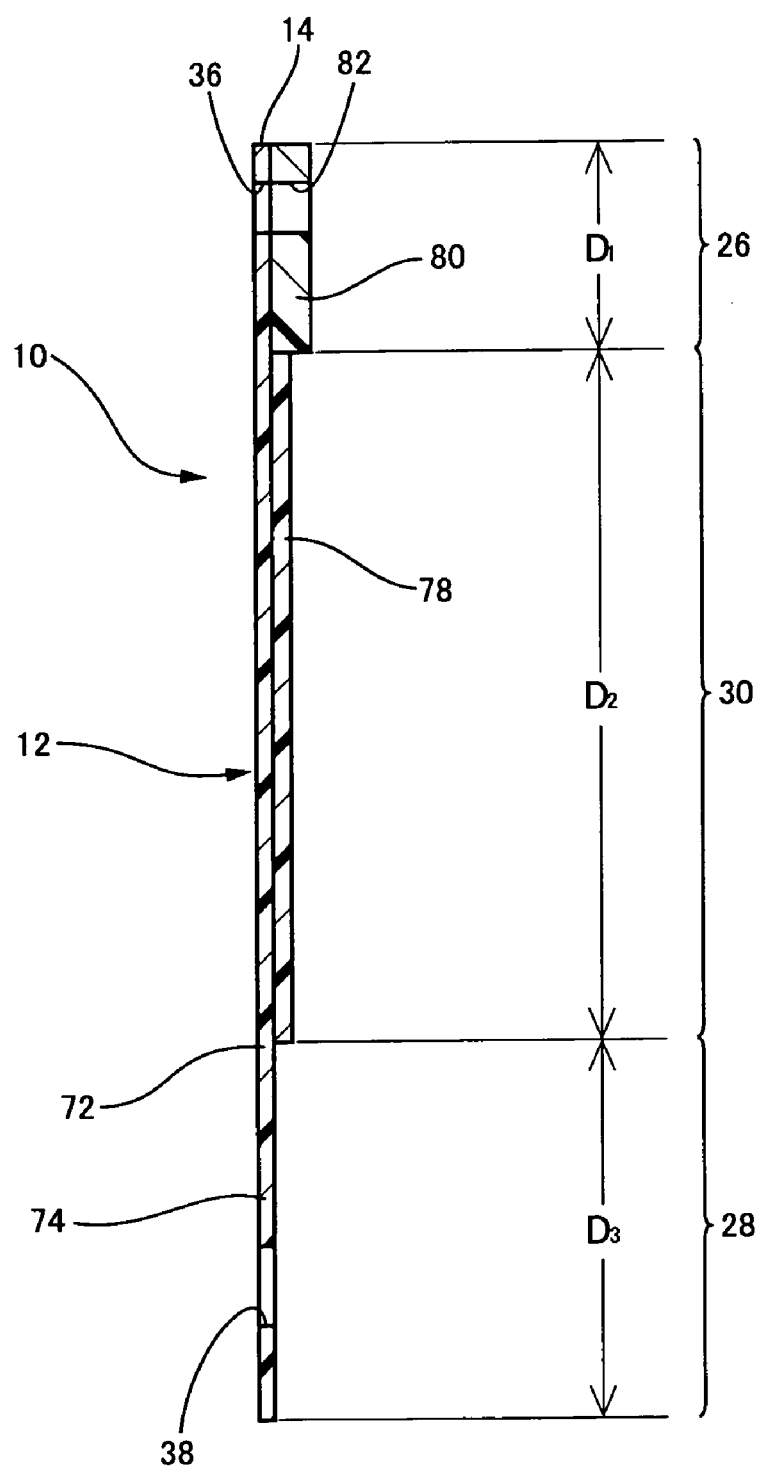
FIG. 9 is a cross-sectional view, corresponding to FIG. 2, of a pedestrian protection apparatus according to a fourth embodiment of the present invention.

FIG. 9 shows a leg sweep member 10 according to a fourth embodiment of the present invention. In the fourth embodiment, the ribs 16 to 24 are removed from the front section 26 and the center section 30. In this case, a first plate-shaped reinforcing member 78 having a predetermined thickness is fixed on the entirety of one surface of the center section 30, and a second plate-shaped reinforcing member 80 is fixed on the entirety of one surface of the front section 26. The thickness and rigidity of the second plate-shaped reinforcing member 80 are larger than those of the first plate-shaped reinforcing member 78. This also allows the rigidity of the base plate 12 to become lower in the order of the front section 26, the center section 30, and the rear section 28.

In this case, the materials of the first plate-shaped reinforcing member 78 and the second plate-shaped reinforcing member 80 are not particularly limited. Further, the first plate-shaped reinforcing member 78 may be fixed on both surfaces of the center section 30, and the second plate-shaped reinforcing member 80 may be fixed on both surfaces of the front section 26. Alternatively, the first plate-shaped reinforcing member 78 and the second plate-shaped reinforcing member 80 may be fixed on the other surfaces of the sections. Through-holes 82 are provided in the second plate-shaped reinforcing member 80 fixed on the front section 26. The through-holes 82 are provided corresponding to and coaxially with the through-holes 36 in the front section 26, and have the same shape and size as those of the through-holes 36.

Figure 10:
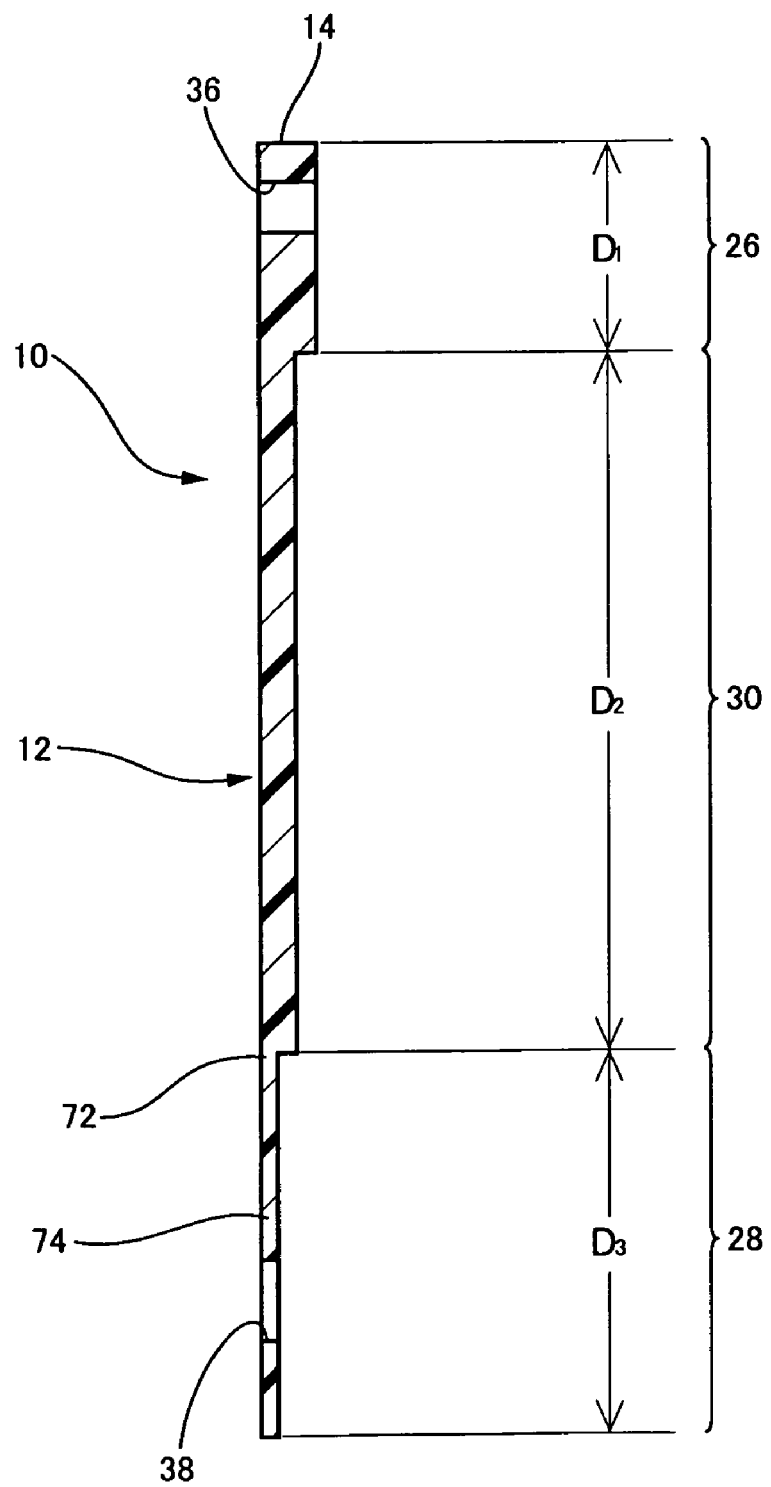
FIG. 10 is a cross-sectional view, corresponding to FIG. 2, of a pedestrian protection apparatus according to a fifth embodiment of the present invention.

FIG. 10 shows a leg sweep member 10 according to a fifth embodiment of the present invention. In the fifth embodiment, instead of forming the ribs 16 to 24 on the front section 26 and the center section 30 of the base plate 12 or fixing the reinforcing plates 78 and 80 having mutually different rigidities thereon, the thickness of the base plate 12 is made different among the sections, that is, so that the thickness becomes smaller in the order of the front section 26, the center section 30, and the rear section 28. This also allows the rigidity of the base plate 12 to become lower in the order of the front section 26, the center section 30, and the rear section 28.

While the center section 30 of the base plate 12 has a uniform rigidity in the above embodiments, a plurality of areas having mutually different rigidities may be provided in the center section 30 so as to extend over the full dimension in the breadth direction, to adjoin in the depth direction, and to be arranged in decreasing order of the rigidities from a front side of the center section.

Figure 11:
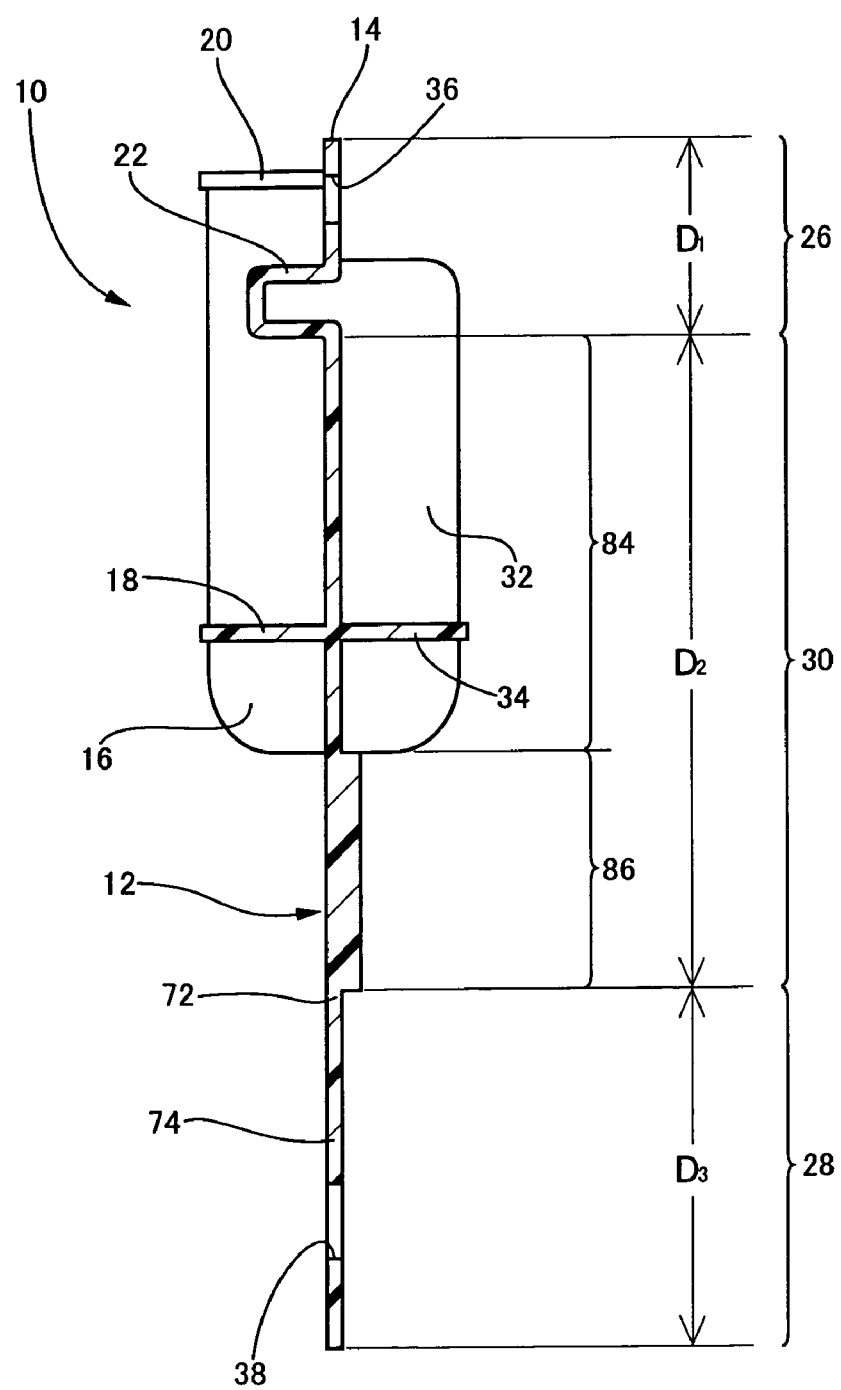
FIG. 11 is a cross-sectional view, corresponding to FIG. 2, of a pedestrian protection apparatus according to the present invention.

FIG. 11 shows a leg sweep member 10 according to a sixth embodiment of the present invention. In the sixth embodiment, the center section 30 is further divided into two areas, that is, a front center area 84 and a rear center area 86. A plurality of first ribs 16 and a third rib 18, and a plurality of first auxiliary ribs 32 and a second auxiliary rib 34 respectively protrude on the upper surface and the lower surface of the front center area 84 so that the front center area 84 is less rigid than the front section 26 and more rigid than the rear section 28. On the other hand, the rear center area 86 is made thick so that the center area 86 is less rigid than the front center area 84 and is more rigid than the rear section 28.

In the leg sweep member 10 having the above-described configuration, the base plate 12 is bent and deformed not only at the boundary portion 72 and the front adjacent portion 74, but also at a boundary portion between the front and rear center areas 84, 86 of the center section 30, depending on the volume of the shock applied in a collision between the leg portion 66 of the pedestrian and the front of the automobile (for example, the front bumper 40). This advantageously suppresses an excessive increase in the impact load in the early stage of the input of the shock.

When such portions having mutually different rigidities are provided in the center section 30 of the base plate 12, the number of the portions may be three or more.

Further, when some portions having mutually different rigidities are thus provided in the center section 30, for example, various types of ribs may be provided in the sections in different numbers or with different thicknesses, reinforcing members having different thicknesses may be fixed to the portions, or the portions may have different thicknesses. These structures may be appropriately adopted in combination.

In addition, the present invention is advantageously applied not only to the pedestrian protection apparatus installed inside the bumper fixed at the front of the automobile, but also to a pedestrian protection apparatus installed at the front of the automobile independently of the bumper, and pedestrian protection apparatuses that are installed in various manners at the fronts of vehicles other than the automobile.

While the specific embodiments of the present invention have been described in detail above, the embodiments are just exemplary, and the present invention can be carried out in other various manners. It is to be understood that the present invention is not limited to the foregoing description, but may be embodied with various changes, modifications and improvements that may occur to those skilled in the art, without departing from the scope of the invention defined in the attached claims.

EXAMPLES

Representative examples of the present invention will be described below in order to more clearly specify the characteristics of the invention. It should be noted that the present invention is not limited to the description of the examples.

Example 1

A leg sweep member serving as a first invention example having a configuration according to the present invention was formed and prepared by ejection molding using polypropylene. In this leg sweep member, the thickness and rigidity of a base plate become smaller in the order of a front section, a center section, and a rear section thereof, as shown in FIG. 10. The total dimension of the base plate in the depth direction is 200 mm, and the dimensions of the front section, the center section, and the rear section of the base plate are 50 mm, 100 mm, and 50 mm, respectively. The thicknesses of the front section, the center section, and the rear section are 3.0 mm, 2.5 mm, and 2.0 mm, respectively.

For comparison, a leg sweep member serving as a first comparative example was formed and prepared by ejection molding using polypropylene. In the first comparative example, the thicknesses of a front section, a center section, and a rear section of a base plate are 2.0 mm, 2.5 mm, and 3.0 mm, respectively. That is, the thickness of the base plate becomes larger in the order of the front section, the center section, and the rear section thereof so that the rigidity of the base plate becomes higher in the order of the front section, the center section, and the rear section thereof.

A leg sweep member serving as a second comparative example was also formed and prepared by ejection molding using polypropylene. In the second comparative example, the thicknesses of a center section, a rear section, and a front section of a base plate are 3.0 mm, 2.5 mm, and 1.5 mm, respectively, so that the rigidity of the base plate becomes lower in the order of the center section, the rear section, and the front section thereof. Moreover, a leg sweep member serving as a third comparative example was formed and prepared by ejection molding using polypropylene. In the third comparative example, a base plate has a uniform thickness of 2.5 mm, and has a uniform rigidity.

Figure 12:
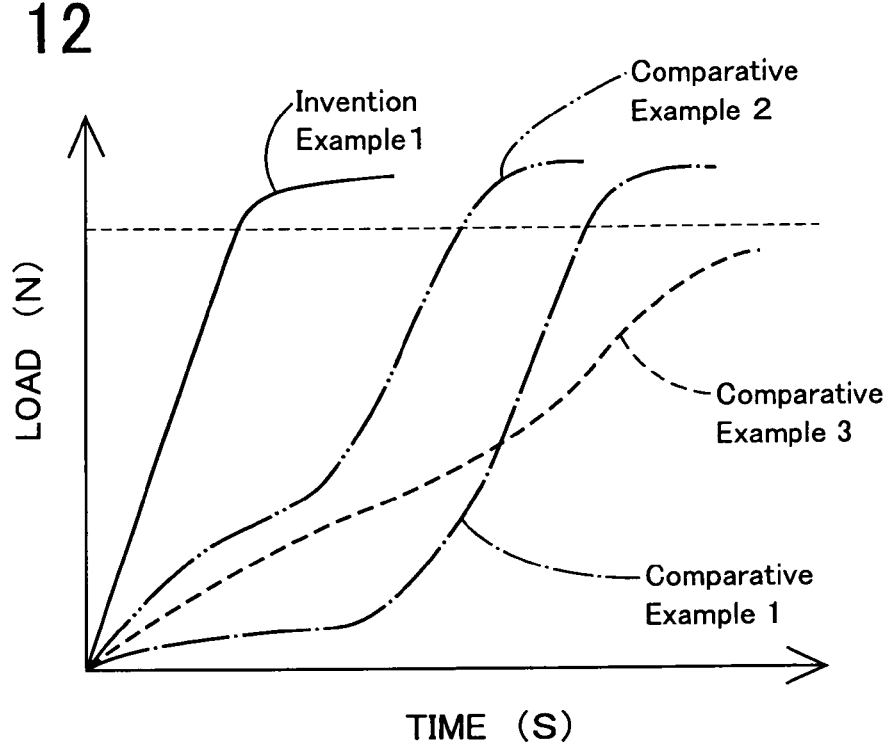
FIG. 12 is a graph showing changes of impact loads with time found in a pedestrian collision test conducted on the assumption that a pedestrian collides with the front of a vehicle in which a pedestrian protection apparatus having a configuration according to the present invention is installed and in pedestrian collision tests conducted on the assumption that the pedestrian collides with the front of the vehicles in which pedestrian protection apparatus having configurations different from the configuration of the present invention are installed.

In the manner shown in FIG. 4, the prepared leg sweep members having different structures, that is, the first invention example and the first to third comparative examples were respectively mounted inside bumper covers of front bumpers fixed at the fronts of actual vehicles (automobiles), thereby obtaining four types of test vehicles. Subsequently, a pedestrian collision test was conducted on each of the test vehicles on the assumption that the front bumper of the test vehicle collided with a pedestrian, and it was checked in a known manner how the impact load inputted to each of the leg sweep members changed with time. FIG. 12 shows the test results. In the pedestrian collision test for each test vehicle, the front of the front bumper of the test vehicle was caused to collide with a dummy having a weight of 14 kg at a speed of 40 km/h.

As shown in FIG. 12, in the leg sweep member of the first invention example, the impact load rapidly increased in the early stage of the input of the shock by the collision with the pedestrian, and instantaneously reached a target load after the collision. In contrast, in the leg sweep members of the first to third comparative examples, the impact load slowly increased in the early stage of the shock input, and reached the target load a relatively long time after the collision, or did not reach the target load. This clearly shows that a reaction force to the impact load can be sufficiently and reliably ensured in the leg sweep member having the structure according to the present invention.

Example 2

A leg sweep member having a configuration according to the present invention shown in FIGS. 1 to 3 was formed and prepared as a second invention example by ejection molding using polypropylene. In the second invention example, the rigidity of a base plate becomes lower in the order of a front section, a center section, and a rear section because of first to fifth ribs provided on the front section and the center section. The total dimension of the base plate in the depth direction is 190 mm, and the dimensions of the front section, the center section, and the rear section of the base are 30 mm, 110 mm, and 50 mm, respectively. The each of the first to fifth ribs provided on the front section and the center section is 3 mm in thickness, and are 25 mm in height.

In addition, a leg sweep member having a configuration according to the present invention was formed and prepared as a third invention example. The third invention example has the same basic structure as that of the above-described second invention example. The dimensions of a front section, a center section, and a rear section of a base plate in the depth direction are 30 mm, 130 mm, and 30 mm, respectively. The dimension of the base plate in the depth direction and the dimension of the front section in the depth direction are equal to those in the second invention example, but the dimension of the center section is larger and the dimension of the rear section is smaller than in the second invention example.

Figure 13:
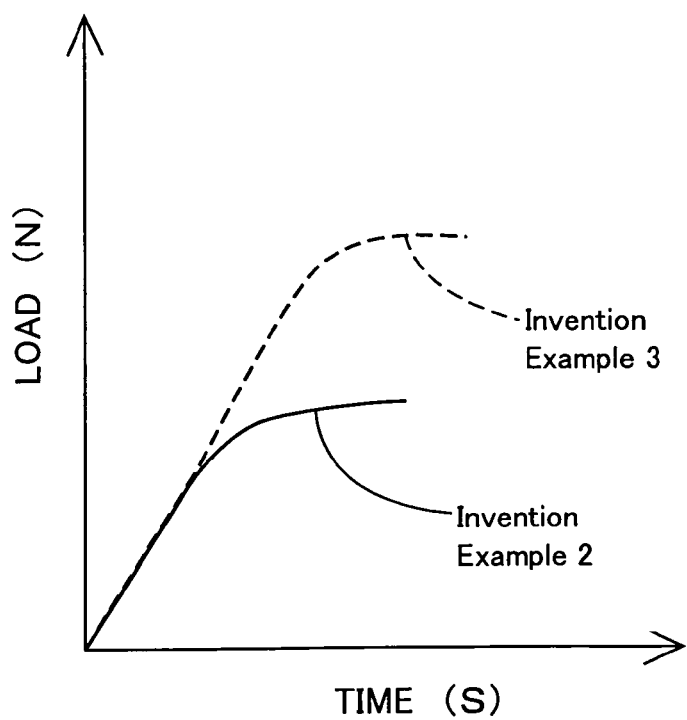
FIG. 13 is a graph showing changes of impact loads with time found in a pedestrian collision test conducted on the assumption that a pedestrian collides with the front of a vehicle in which a pedestrian protection apparatus having a configuration according to the present invention and including a base plate having a center section that is long in the longitudinal direction is installed and in a pedestrian collision test conducted on the assumption that the front of a vehicle, in which a pedestrian protection apparatus having a configuration according to the present invention and including a base plate having a center section that is short in the longitudinal direction is installed, collides with the pedestrian.

In a manner similar to that for the first example, the leg sweep members of the second and third invention examples thus prepared and having different configurations were installed at the fronts of actual vehicles (automobiles), thereby obtaining two-types of test vehicles. A pedestrian collision test similar to that for the first example was conducted on each of the test vehicles, and it was checked in a known manner how the impact load inputted to the leg sweep member in a collision with the pedestrian changed with time. FIG. 13 shows the test results.

As shown in FIG. 13, the maximum value of the impact load in the leg sweep member of the third invention example, in which the center section of the base plate is longer in the depth direction, is larger than that of the leg sweep member of the second invention example in which the dimension of the center section in the depth direction is shorter. This clearly shows that the load characteristic of the leg sweep member can be easily tuned by changing the dimension in the depth direction of the center section whose rigidity is between the rigidities of the front section and the rear section, and thereby adjusting the distance between the boundary portion between the center section and the rear section, and the front adjacent portion on the front side of and adjacent to the portion of the rear section fixed to the vehicle.

Example 3

First, the leg sweep member of the second invention example in the above-described second example was prepared. In addition, a fourth invention example having a configuration according to the present invention shown in FIG. 8, and having a basic structure similar to that of the second invention example was prepared. In the leg sweep member of the fourth invention example, an iron reinforcing plate having a predetermined flexural rigidity is fixed on a lower surface of a base plate so as to extend over a boundary portion and a front adjacent portion. The reinforcing plate has a thickness of 1.0 mm, and a dimension of 80 mm in the depth direction.

Figure 14:
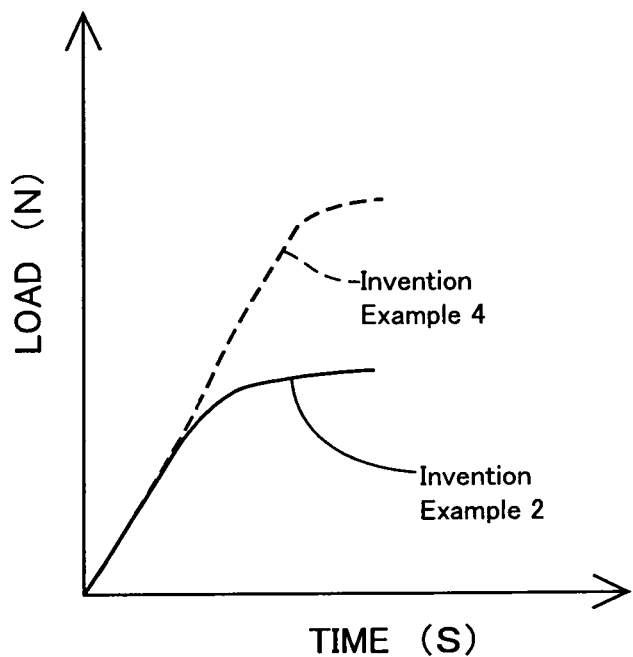
FIG. 14 is a graph showing changes of impact loads with time found in a pedestrian collision test conducted on the assumption that the front of a vehicle, collides with a pedestrian in which a pedestrian protection apparatus having a configuration according to the present invention and including a reinforcing plate fixed on a base plate so as to extend over a boundary portion and a front adjacent portion is installed and in a pedestrian collision test conducted on the assumption that the front of a vehicle, in which a pedestrian protection apparatus having a configuration according to the present invention and including a base plate having no reinforcing plate is installed, collides with the pedestrian.

In a manner similar to that for the above-described first example, the two-types of leg sweep members of the second and fourth invention examples were installed at the fronts of actual vehicles (automobiles) to obtain two-types of test vehicles. Subsequently, a pedestrian collision test similar to that for the first example was conducted on each of the test vehicles, and it was checked in a known manner how the impact load inputted to the leg sweep member in a collision with a pedestrian changed with time. FIG. 14 shows the test results.

As show in FIG. 14, the maximum value of the impact load in the leg sweep member of the fourth invention example, in which the reinforcing plate is fixed on the lower surface of the base so as to extend over the boundary portion and the front adjacent portion, is larger than that in the leg sweep member of the second invention example in which the reinforcing plate is not provided. This clearly shows that the load characteristic of the leg sweep member can also be easily tuned by fixing the reinforcing plate on the lower surface of the base so as to extend over the boundary portion and the front adjacent portion.

Example 4

First, the leg sweep member of the second invention example in the above-described second example was prepared. In addition, a leg sweep member having a basic structure similar to that of the second invention example was prepared as a fifth invention example. In the fifth invention example, separately from first and second ribs provided on a front section and a center section of a base plate, a reinforcing rib protrudes integrally from a lower surface of the base plate so as to extend over a boundary portion and a front adjacent portion. The dimension of the reinforcing rib in the depth direction is 80 mm, and the thickness thereof is 1.0 mm. By forming this reinforcing rib, the rigidities of the front, center, and rear sections of the base are stably balanced so that the rigidity of the base plate becomes lower in the order of the front section, the center section, and the rear section.

Figure 15:
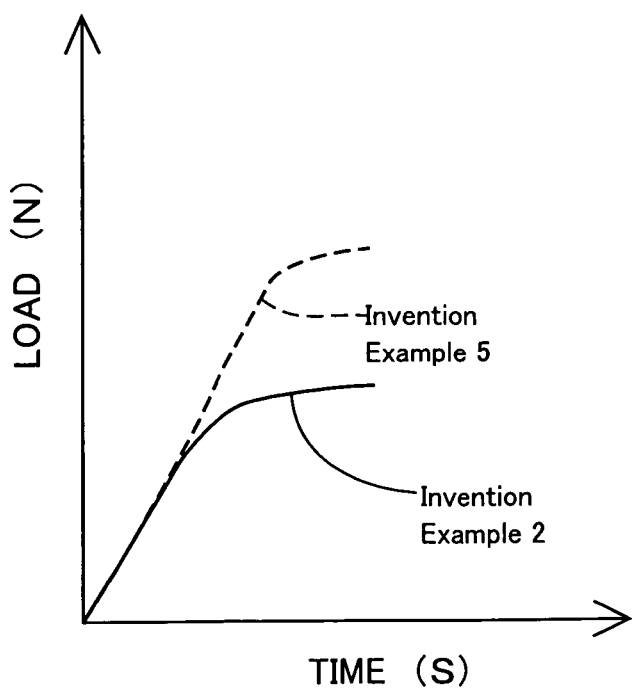
FIG. 15 is a graph showing changes of impact loads with time found in a pedestrian collision test conducted on the assumption that the front of a vehicle, in which a pedestrian protection apparatus having a configuration according to the present invention and including a reinforcing rib provided integrally with a base plate so as to extend over a boundary portion and a front adjacent portion is installed, collides with a pedestrian and in a pedestrian collision test conducted on the assumption that the front of a vehicle, in which a pedestrian protection apparatus having a configuration according to the present invention and including a base plate having no reinforcing rib is installed, collides with the pedestrian.

In a manner similar to that for the above-described first example, the two-types of leg sweep members of the second and fifth invention examples were installed at the fronts of actual vehicles (automobiles) to obtain two-types of test vehicles. Subsequently, a pedestrian collision test similar to that in the first example was conducted on each of the test vehicles, and it was checked in a known manner how the impact load inputted to the leg sweep member in a collision with a pedestrian changed with time. FIG. 15 shows the test results.

As shown in FIG. 15, the maximum value of the impact load in the leg sweep member of the fifth invention example, in which the reinforcing rib is provided integrally with the lower surface of the base plate so as to extend over the boundary portion and the front adjacent portion, is larger than that in the leg sweep member of the second invention example in which the reinforcing rib is not provided. This clearly shows that the load characteristic of the leg sweep member can also be easily tuned by forming the reinforcing rib integrally with the lower surface of the base so as to extend over the boundary portion and the front adjacent portion.

What is claimed is:

1. A pedestrian protection apparatus for a vehicle comprising:
   a synthetic resin plate mounted in a lower part of a front side of a vehicle and extending in a longitudinal direction of the vehicle, the plate including a front section having at least a protruding portion protruding from the front side of the vehicle, a rear section fixed to the vehicle, and a center section provided between the front and rear sections,
   wherein, upon impact with a pedestrian, the protruding portion of the front section of the plate sweeps away a lower part of a leg of the pedestrian to protect the leg when the front side of the vehicle collides with the leg, and
   wherein the front section of the plate is more rigid than the rear section, and the center section is less rigid than the front section and more rigid than the rear section, such that, upon impact with the pedestrian, the rear section deforms before the front section or center section.

2. The pedestrian protection apparatus according to claim 1, wherein the center section of the plate includes a plurality of areas having mutually different rigidities, and the areas extend over a full dimension of the vehicle in a transverse direction, adjoin in the longitudinal direction of the vehicle, and are arranged in decreasing order of the rigidities from a front side of the center section.

3. The pedestrian protection apparatus according to claim 1,
wherein a plurality of reinforcing ribs extending in the longitudinal direction of the vehicle are provided integrally with each of the front and center sections of the plate so as to be spaced in the transverse direction of the vehicle, and the front and center sections are more rigid than the rear section in which the reinforcing ribs are not provided, and
wherein the number of the reinforcing ribs provided in the front section is larger than the number of the reinforcing ribs provided in the center section, and the interval between the reinforcing ribs of the front section in the transverse direction of the vehicle is shorter than the interval between the reinforcing ribs of the center section so that the front section is more rigid than the center section.

4. The pedestrian protection apparatus according to claim 1, wherein the center section of the plate is thicker than the rear section so that the center section is more rigid than the rear section, and the front section is thicker than the center section so that the front section is more rigid than the center section.

5. The pedestrian protection apparatus according to claim 1, wherein a first plate-shaped reinforcing member having a predetermined rigidity is fixed on at least one surface of the center section so that the center section is more rigid than the rear section, and a second plate-shaped reinforcing member which is more rigid than the first plate-shaped reinforcing member is fixed on at least one surface of the front section so that the front section is more rigid than the center section on which the first plate-shaped reinforcing member is fixed.

6. A method of tuning a load characteristic of a pedestrian protection apparatus for a vehicle,
wherein the pedestrian protection apparatus comprises:
a synthetic resin plate mounted in a lower part of a front side of a vehicle and extending in a longitudinal direction of the vehicle, the plate including a front section having at least a protruding portion protruding from the front side of the vehicle, a rear section having a fixed portion fixed to the vehicle, and a center section provided between the front and rear sections,
wherein the protruding portion of the front section of the plate comes into contact with and sweeps away a lower part of a leg of a pedestrian to protect the leg when the front of the vehicle collides with the leg,
wherein the front section of the plate is more rigid than the rear section, and the center section is less rigid than the front section and more rigid than the rear section so that the plate is bent at a boundary portion between the center section and the rear section and at a front adjacent portion of the rear section on the front side of and adjacent to the fixed portion by an impact load which is inputted when the protruding portion of the front section comes into contact with the leg of the pedestrian, and
wherein a maximum value of the impact load is adjusted and the load characteristic is tuned by arbitrarily changing the dimension of the center section in the longitudinal direction of the vehicle so as to change the distance between the boundary portion and the front adjacent portion.

7. A method of tuning a load characteristic of a pedestrian protection apparatus for a vehicle,
wherein the pedestrian protection apparatus comprises:
a synthetic resin plate mounted in a lower part of a front side of a vehicle and extending in a longitudinal direction of the vehicle, the plate including a front section having at least a protruding portion protruded from the front side of the vehicle, a rear section having a fixed portion fixed to the vehicle, and a center section provided between the front and rear sections,
wherein the protruding portion of the front section of the plate comes into contact with and sweeps away a lower part of a leg of a pedestrian to protect the leg when the front side of the vehicle collides with the leg,
wherein the front section of the plate is more rigid than the rear section, and the center section is less rigid than the front section and more rigid than the rear section so that the plate is bent at a boundary portion between the center section and the rear section and at a front adjacent portion of the rear section on the front side of and adjacent to the fixed portion by an impact load which is inputted when the protruding portion of the front section comes into contact with the leg of the pedestrian, and
wherein a maximum value of the impact load is adjusted and the load characteristic is tuned by fixing a first plate-shaped reinforcing member to the boundary portion and fixing a second plate-shaped reinforcing member to the front adjacent portion, the first reinforcing member increasing a rigidity of the boundary portion within a range below that of the front section, and the second reinforcing member increasing a rigidity of the front adjacent portion within a range below that of the center section.

8. The method according to claim 6, wherein the center section of the plate includes a plurality of areas having mutually different rigidities, and the areas extend over a full dimension of the vehicle in a transverse direction, adjoin in the longitudinal direction of the vehicle, and are arranged in decreasing order of the rigidities from a front side of the center section.

* * * * *